INVENTORS.
Allan M. Cameron,
Valentine Lelinski
BY Ira J. Wilson
Atty.

Oct. 30, 1945.　　A. M. CAMERON ET AL　　2,387,743
CAN TESTING MACHINE
Filed Dec. 30, 1942　　3 Sheets-Sheet 2
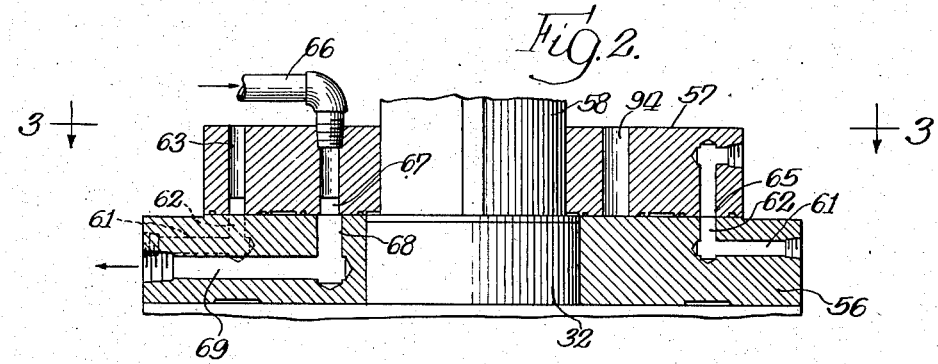
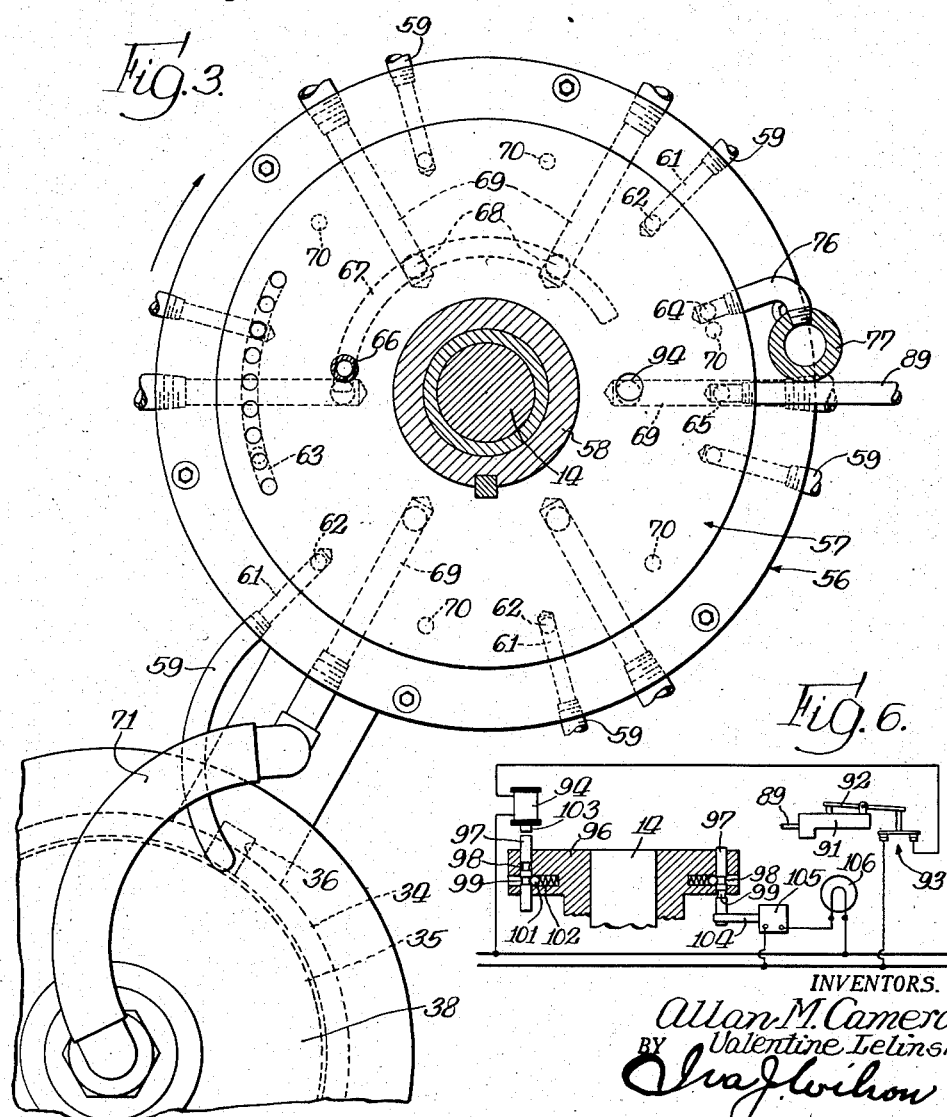
INVENTORS.
Allan M. Cameron,
BY Valentine Zelinski
Ira J. Wilson
Atty.

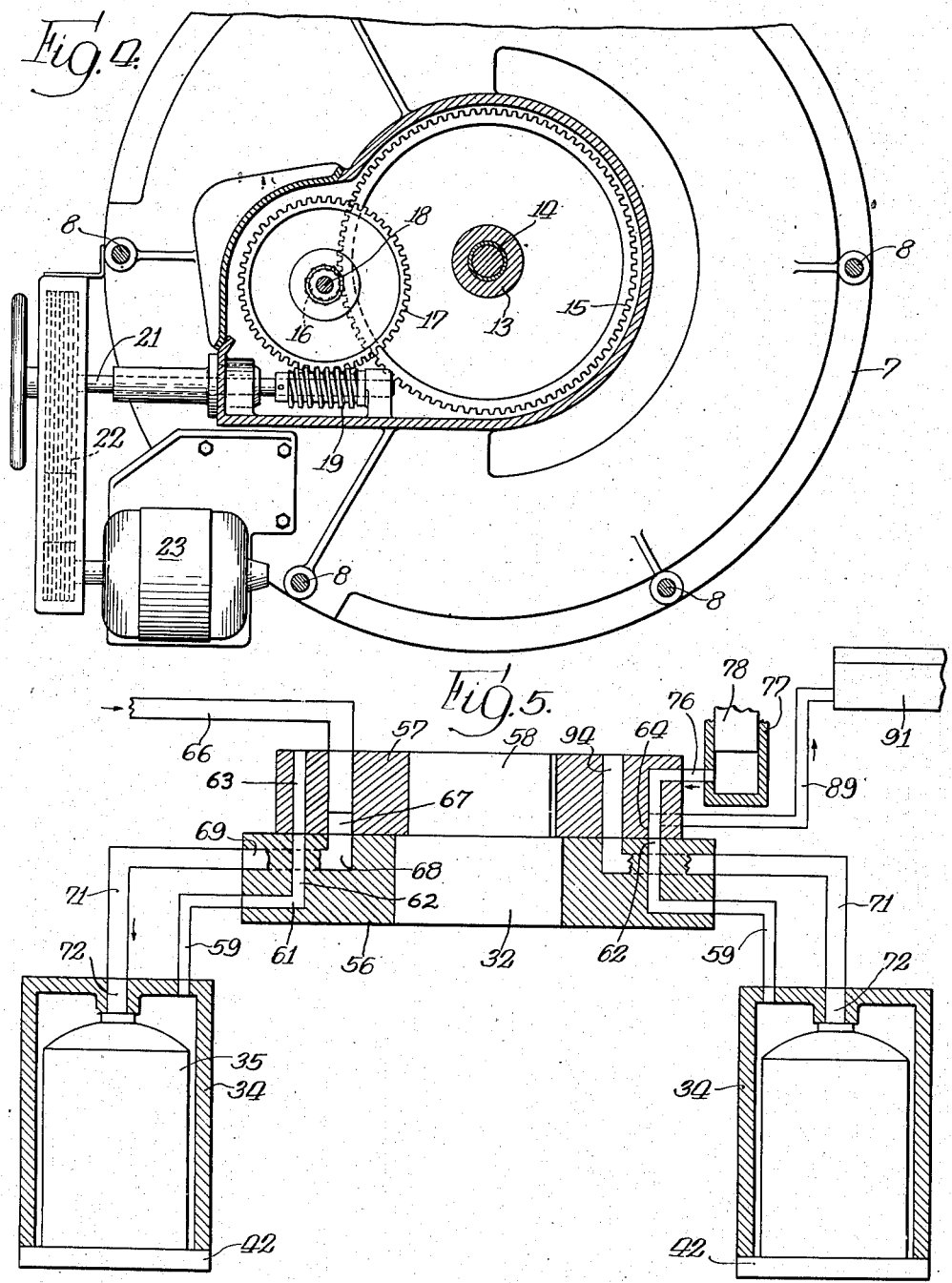

Patented Oct. 30, 1945

2,387,743

UNITED STATES PATENT OFFICE 2,387,743

CAN TESTING MACHINE

Allan M. Cameron, River Forest, and Valentine Lelinski, Chicago, Ill., assignors to Cameron Can Machinery Co., Chicago, Ill., a corporation of Illinois Application December 30, 1942, Serial No. 470,576

11 Claims. (Cl. 73—42)

This invention relates to apparatus for testing containers for leakage. The principles thereof may be utilized in testing containers varying widely in dimensions and contour. As illustrative of the invention, we have selected and here disclose a machine designed for the testing of five gallon containers, which are referred to herein as cans. The word "can," however, is used in a generic sense, and should be understood to embrace containers made of various materials and in various sizes.

The primary purpose of our present invention is to provide a machine of this character which will possess a high degree of sensitivity so as to be able to detect slight or slow leaks which have heretofore been incapable of detection by any practical testing apparatus with which we are familiar.

Can testing is customarily performed by sealing the can in a testing pocket, admitting air under pressure to the interior of the can and utilizing the increased pressure in the pocket surrounding the can, produced by leakage of air from within the can, to actuate an indicating device. Since a slight leak permits the escape of air from the interior of the can only very slowly, such leaks could heretofore be detected only by leaving the can under pressure in the testing pocket for an impractically long period of time. Since modern high speed can production does not allow an impractical length of time for testing purposes, a compromise between time and accuracy has become customary, with the result that many cans which were actually imperfect, because of a slight leak which could not be detected in the permissible time, were passed as good cans. The ultimate leakage or spoilage of the contents of such cans has been a matter of no little dissatisfaction to the users.

Our present invention aims to overcome the condition aforementioned by providing a testing apparatus which will be capable of detecting, within the permissible time allowed for testing purposes, and indicating those minute leaks which have heretofore been incapable of detection by the less sensitive testing apparatus commonly employed.

Our invention also contemplates the provision of a machine which will not only possess a high degree of testing sensitivity but will be simple in construction and reliable and durable in operation.

On the accompanying drawings exemplifying one form of our invention, the machine shown is of the vertical type, but it should be understood that the principles of our invention are equally suitable for embodiment in machines of the horizontal type.

Referring to the drawings,

Fig. 2 is an enlarged fragmentary sectional view taken through the control valve;

Fig. 3 is a plan view of the control valve viewed from above, as indicated by the line 3—3 of Fig. 2;

Fig. 4 is a transverse sectional view on the line 4—4 of Fig. 1;

Fig. 5 is a schematic view illustrating the connections established by the control valve during testing; and Fig. 6 is a schematic view showing the signaling circuits.

Figure 1:
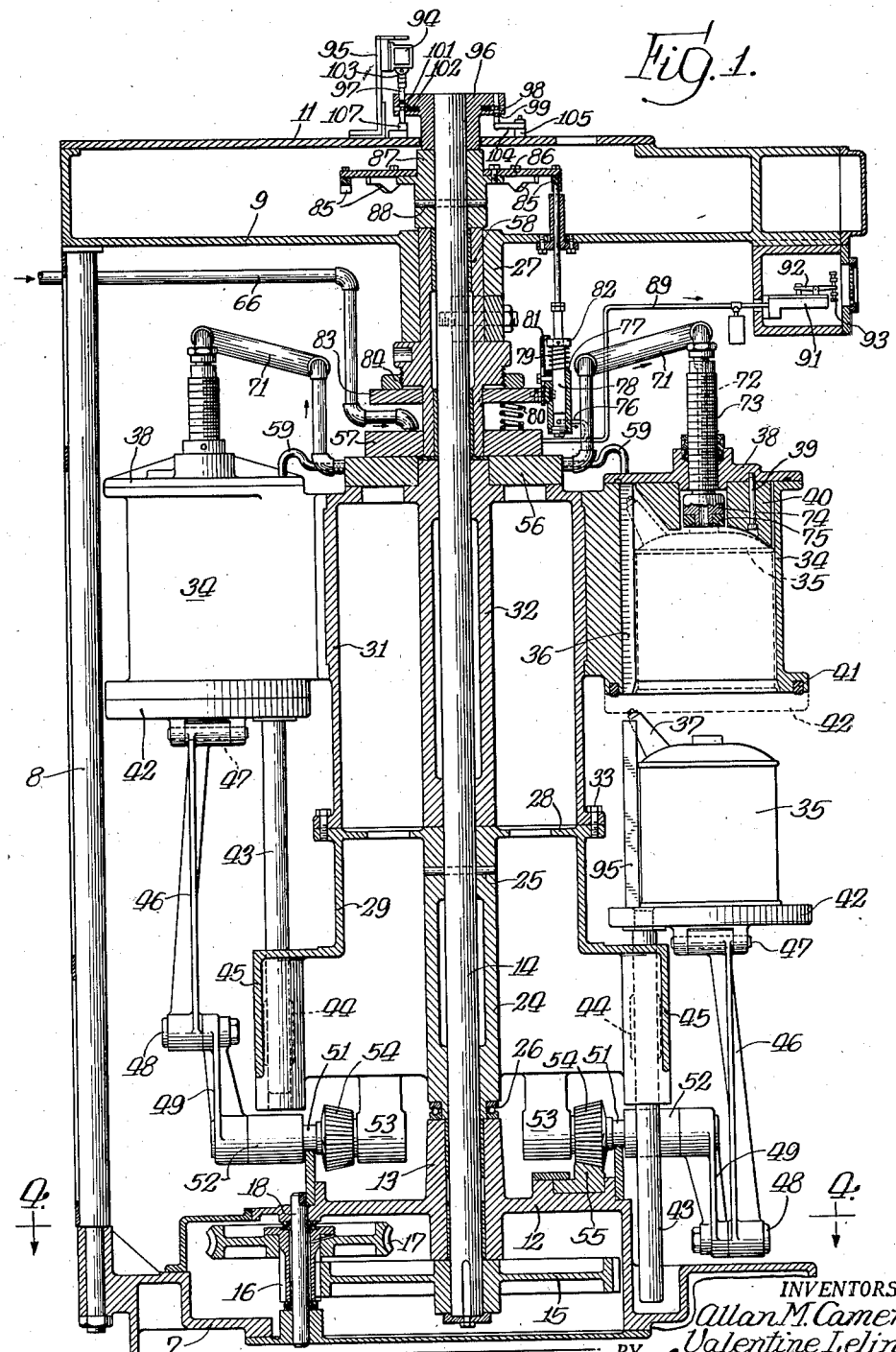
Fig. 1 is a vertical sectional view through a testing machine constructed in accordance with our invention.

Referring to the drawings more specifically, it will be apparent from an inspection of Fig. 1 that the machine illustrated is of the vertical rotary type, comprising a base 7 carrying upright standards 8 upon which is supported a top member 9 having a removable cover 11. A transverse support 12 formed integrally with the base provides an elongated vertical bearing 13 for an upright shaft 14 provided at its lower end with a gear 15 which meshes with and is driven by a pinion 16 formed integrally with a worm wheel 17 and mounted upon a pintle 18. The worm wheel is driven through a worm 19 from a shaft 21, which in turn is driven through a V-belt or other suitable driving connection 22 from a motor 23.

A sleeve 24 surrounding the shaft 14, and connected therewith by a pin 25 or a key, is supported upon the upper end of bearing 13 through the intermediary of ballbearing 26. The upper end of shaft 14 is journaled in a bearing 27 depending from the top member 9 and the sleeve 24 fixed to the shaft 14 carries by means of radial webs 28 the lower portion 29 of a shell or frame, the upper portion 31 of which is provided with a sleeve 32 surrounding the shaft 14 and resting upon the upper end of sleeve 24, this upper portion being rigidly connected to the lower portion 29 by a plurality of bolts 33. It will thus be apparent that the frame structure 29—31 is fixed to and rotates with the upright shaft 14.

The upper portion 31 of the frame structure carries a plurality of, in the present instance six, testing pockets designated generally by reference character 34, each pocket being interiorly shaped to the general contour of the can to be tested. In the form illustrated, in which the cans 35 for which the machine is designed are shown, one side of each pocket is provided with a groove 36 to accommodate the nozzle 37 of the can during the introduction of the can into and its withdrawal from the pocket. To conform the interior of the pocket to the upper contour of the can, a filler plug 40 having the general contour of the can top is secured to the upper end 38 of the pocket by bolts 39. Each pocket is provided around its open lower end with a seal ring 41 of rubber or other suitable sealing material.

Beneath and in alignment with each pocket there is disposed a reciprocatory table 42 guided in its reciprocatory movements by a rod 43 sliding in a bearing 44 formed on the inner face of the depending flange 45, and reciprocatory movements are imparted to the table by a connecting rod 46 pivotally connected at 47 to the table and connected at its lower end to a crank pin 48 carried by a crank arm 49 which in turn is fixed upon a shaft 51 journaled in bearings 52 and 53 and carrying a beveled gear 54 adapted to mesh with an arcuate rack 55 fixed on the support 12.

It will be obvious that as the frame structure carrying the testing pockets, the reciprocatory tables and the actuating bevel gears and cranks is rotated with the shaft 14, engagement of a gear 54 with the arcuate rack 55 will cause the table to be elevated from the loading position shown at the right in Fig. 1 to the position shown at the left in said figure to thereby introduce the can into the pocket and bring the table into sealing engagement with the gasket 41 to seal the lower end of the pocket. The table is held in this elevated position by engagement of an untoothed flat portion of the arcuate rack 55 with a flat spot on the gear 54, as is customary in double seaming machines.

Upon the upper end of the upper frame structure portion 31 there is fixedly mounted to rotate therewith the rotor 56 of a rotary valve. The stator 57 of this valve which cooperates with the rotor is mounted upon the lower end of a sleeve 58 interposed between the bearing member 27 and the shaft 14. The bearing member, the sleeve and the stator are locked together into a rigid assembly relatively to which the rotor 56 revolves.

The upper end of each testing pocket is connected by a conduit 59 with a passage 61 of the rotor which has an upward extension 62 opening toward the opposed face of the stator. This passage or port is located at an equal radial distance from the valve center with an arcuate slot 63 in the stator through which communication is established between the pocket and the atmosphere during a portion of the travel of the rotor. The ports 62 are also adapted to register in succession at a later time with port 64 in the stator connected with a pressure creating device and at a still later time with a port 65 connected with a pressure sensitive instrument, all as will be later described.

A conduit 66 connected with any suitable source of air supply under pressure is connected with an arcuate groove 67 of the stator positioned to communicate with successive ports 68 of the rotor as they are brought into registration with the groove. A passage 69 in the rotor extends radially outwardly from each port 68 and is connected by a conduit 71 with a passage 72 extending through a threaded nipple 73 adjustably carried by the pocket top 38. A head 74 carried by the inner end of the nipple is equipped with a gasket 75 adapted when the can is forced into engagement therewith by the table 42 to establish a hermetically sealed communication between the air conduit and the interior of the can.

The port 64, previously mentioned as being located to align with port 62 in a predetermined position of the valve rotor, is connected by a conduit 76 with a pressure creating device 77 which consists of a cylinder and a piston 78 therein adapted upon downward movement to compress the air in the cylinder beneath the piston and thereby create a pressure in the passages communicating therewith and in the testing pocket with which said passages are connected. The piston is normally urged into the upper position shown in Fig. 1 by an expansion spring 79, the upward movement of the piston being limited by an adjustable abutment member 81 against which a collar 82 on the piston rod is adapted to abut under the influence of spring 79. The cylinder of the pressure creating device is carried upon a disc 83 which in turn is adjustable upon the sleeve 58 for the purpose of regulating the tension of springs 80 which urge the stator 57 against the rotor 56. A ring nut 84 threaded on the head of the sleeve 58 holds the disc 83 in adjusted position.

The piston is actuated at predetermined intervals by suitably positioned cams 85 carried upon a cam ring 86 which is supported by and rotatable with a sleeve 87 secured to the shaft 14 by a pin 88 or key. As the cams are brought successively into operative relation with the upper end of the piston rod, the rod is depressed against the force of spring 79 to create an air pressure, as previously mentioned.

The port 65 in the stator is connected by a conduit 89 with a pressure sensitive device 91 consisting of a chamber and a diaphragm which, upon the creation of a predetermined pressure in the chamber, actuates a lever 92 to close a switch 93 in an electric circuit including an electromagnet 94 carried by a bracket 95 above the timing head 96 fixed on the shaft 14. This head is provided with a plurality of vertically reciprocable plungers 97 corresponding in number and arrangement with the testing pockets. Each plunger is provided with two spaced apart peripheral grooves 98 and 99 into one or the other of which a latching ball 101 is urged by a spring 102 to hold the plunger in elevated or depressed position.

When the electromagnet is energized by the closing of the switch 93 as the result of a leaky can, its core 103 is snapped downwardly against the upper end of that plunger 97 which at that instant is directly beneath the core, thereby depressing such plunger into position to engage an arm 104 projecting from a switch 105 into the path of said plunger as it is carried around by the head 96. Actuation of the arm by the plunger closes the switch 105 in a circuit including a light bulb 106 or other visible or audible signal, whereby notice to the operator is given of the presence of a leaky can.

The switch arm is so positioned on the machine that the signal indicating a leaky can will be given just as that particular can reaches the station where it will be removed from the machine. By reason of the delayed and properly timed signalling of the presence of a defective can, any confusion of the operator concerning which can is defective is obviated.

After the depressed plunger has actuated the switch arm, such plunger is restored to normal elevated position by a stationary inclined cam 107 up which the lower end of the plunger rides as the head continues its rotary movement.

It will be obvious that when a port 62 is brought into registration with the port 65, communication will be established between the testing chamber and the diaphragm chamber, so that, if the pressure in the testing chamber is above that for which the indicating device is set, the diaphragm will be actuated to close the circuit and thereby give a signal to the operator. Shortly after communication is established between the testing chamber and the diaphragm chamber the air pressure passage 69 is brought into registration with an exhaust port 94 in the stator through which the air pressure within the can is released to atmosphere, and shortly following one of the exhaust ports 70 in the rotor registers with port 65 to relieve to atmosphere the pressure in the diaphragm chamber.

The operation of the machine is substantially as follows. Assuming that the operator has placed a can to be tested on the table 42 and that the revolving frame structure and parts carried thereby are being rotated in a clockwise direction viewing Fig. 3, the can is first elevated into the testing chamber, the lower end of which becomes sealed by pressure of the table against the gasket 41, at which time the opening in the top of the can has been forced against the gasket 75 to establish a sealed connection with the conduit 71. At this time the groove 36 in the pocket is substantially filled by an elongated filler block 95 carried by the table to thereby minimize the cubical contents of the pocket space surrounding the can. Assuming that the particular pocket with which we are concerned is in the position indicated in Fig. 3 after the can has been positioned therein, further rotation of the pocket with the shaft 14 brings the port 62 into communication with the arcuate slot 63, thus establishing communication between the pocket chamber and atmosphere to relieve any pressure created in the pocket by the introduction of the can. Further movement of the pocket and valve rotor brings the port 68 into communication with the arcuate slot 67, permitting air under pressure from the supply pipe 66 to be delivered through the conduit 71 and its connections to the interior of the can. The groove 67 is of substantial length to insure adequate application of air pressure to the can interior. The air pressure is thus supplied to the can during the time that the valve rotor is traveling through substantially 150°, as will be apparent from Fig. 3. Any defect in the can which will permit leakage will enable some of this air under pressure to escape from the can into the surrounding pocket space, thereby increasing the pressure in said space. Upon further movement of the rotor the port 62 connected with the pocket space is brought into registration with the port 64 connected with the pressure creating device 77, at which time the piston of this device is actuated by a cam 85 to produce a predetermined increased pressure in said pocket space.

The pressure sensitive device 91 is set to operate at a predetermined super-atmospheric pressure only slightly greater than the pressure produced by the pressure creating device. If, therefore, no leakage of air pressure from the interior of the can to the surrounding space has occurred, the pressure produced in this space by the pressure creating device will be less than the pressure for which the pressure sensitive device is set, and no actuation of the device will occur when communication is established between this space and the chamber of the pressure sensitive device. Further travel of the rotor establishes communication between the port 62 and the port 65 connected with the pressure sensitive device. If leakage from the interior of the can to the surrounding pocket space has occurred, even though small, the resultant pressure in this space plus the increased pressure produced by the pressure creating device will be sufficient to actuate the pressure sensitive device, thereby signaling the operator of the presence in that particular pocket of a leaky can.

After the pressure of the pocket space is communicated to the pressure sensitive device, the port 68 of the rotor communicates with the exhaust port 94 of the stator, thereby permitting the exhaust through this port of the pressure created within the can, and similarly a port 70 is brought into registration with port 65 to release to atmosphere the pressure remaining in the diaphragm chamber. Immediately following these exhausts, the beveled gear 54, which has in the meantime been held against rotation as previously described, picks up the toothed portion of the rack 55 to thereupon rotate the shaft 51 and lower the table 42 to its initial position, where the tested can may be removed and replaced by another. The sequence of operations as described are carried out in connection with successive testing pockets as they travel around the machine and the cans are accordingly accurately tested for leakage and sorted by the operator as good or bad, in accordance with the indication given for each can as it is subjected to the test.

The structural details of the machine shown and described for illustrative purposes may manifestly be varied within considerable limits without exceeding the scope of this invention as defined in the following claims.

We claim:

1. In a can testing machine, the combination of a pocket in which a can to be tested is adapted to be enclosed, means for creating a super-atmospheric pressure in said can, a device adapted to be actuated by a predetermined super-atmospheric pressure, connected with the pocket space surrounding said can, and means for increasing said pocket space pressure to thereby actuate said device in the event said space pressure exceeds atmospheric prior to such increase.

2. In a can testing machine, the combination of a pocket adapted to receive a can to be tested, means for sealing the open end of said pocket, means for introducing air under pressure to the interior of the can, a pressure sensitive instrument connected with the pocket chamber surrounding the can under pressure, and means for increasing the pressure in said chamber sufficiently to actuate said instrument in the event the pressure in said chamber prior to said increase exceeds atmospheric by reason of leakage from said can.

3. In a can testing machine, the combination of a pocket adapted to receive a can to be tested, means for sealing the space in said pocket surrounding said can, means for creating a super-atmospheric pressure within the can, means for venting the pocket space surrounding the can to atmosphere after the introduction of the can into the pocket, a pressure sensitive device connected with said pocket space and adapted to be actuated by a predetermined super-atmospheric pressure, and means for increasing the pressure in said space over atmospheric by a predetermined amount whereby said pressure sensitive device is actuated if the pressure in said space as the result of can leakage is above atmospheric prior to such pressure increase.

4. In a can testing machine, the combination of a testing pocket within which a can to be tested is adapted to be sealed, a source of air under pressure, a connection through which such air may be introduced into the can in said pocket, a conduit connected with the space surrounding said can, a pressure sensitive device, a valve interposed in the air pressure conduit and connected with the space surrounding the can and with said pressure sensitive device, and means for operating said valve to vent the pocket space to atmosphere upon the introduction of the can thereinto, to subsequently admit air under pressure to the interior of the can and thereafter establish communication between the space surrounding the can and said pressure sensitive device, and means for increasing the pressure in said connection between said spaced and said pressure sensitive device whereby said pressure sensitive device is actuated if the preexisting pressure in said space exceeds atmospheric due to leakage.

5. In a can testing machine, the combination of a rotatable carriage, a plurality of can testing pockets carried thereby, means for introducing cans to be tested into the pockets in succession, means for sealing the ends of the pockets through which the cans are introduced, a conduit extending into each pocket through which air under pressure is introduced into the can in said pocket, a conduit leading from the pocket space surrounding such can, a pressure sensitive instrument, a valve to which said instrument and each of said conduits is connected, means for actuating said valve to first vent to atmosphere the space surrounding a can to be tested, then cause the admission of air under pressure through said first mentioned conduit to the interior of said can, and then establish communication between said surrounding space and said instrument, and means for increasing by a predetermined amount the pressure in said surrounding space to thereby cause the actuation of said instrument in the event the pressure in said space before such increase exceeds atmospheric due to leakage.

6. In a can testing machine, the combination of a rotatable carrier, a plurality of can testing pockets carried thereby, a rotary valve, a connection from said valve to each of said pockets through which air under pressure may be admitted to cans in said pockets, a connection between said valve and the pocket spaces surrounding said cams, a pressure sensitive instrument, a connection between said valve and said instrument, means for actuating said valve to thereby vent the spaces successively to atmosphere, then deliver air under pressure to the interior of the cans and then establish communication between the pocket spaces surrounding the cans and said instrument, and means for imposing super-atmospheric pressure within each of said pocket spaces just prior to the establishment of communication between such space and said instrument sufficient to actuate said instrument in the event that the pressure in said space at the time of such imposition is greater than atmospheric as the result of leakage.

7. In a can testing machine, the combination of a rotatable carrier, a plurality of can testing pockets carried thereby, a pressure sensitive instrument, means for delivering air under pressure to the interior of a can in a pocket, means for venting the space surrounding said can to atmosphere and subsequently connecting said space with said instrument, and means for increasing the pressure in said space by a predetermined amount between said venting and connecting operations.

8. In a can testing machine, the combination of a carrier, a can testing pocket carried thereby, means for positioning a can in said pocket, means for sealing the pocket, a valve, a source of air under pressure connected with the valve, a conduit for conducting said air from the valve to the interior of a can in said pocket, a connection between said valve and the space surrounding the can, a pressure sensitive instrument, a connection between said valve and said instrument, means for actuating said valve so as to vent the pocket space to atmosphere, then admit air under pressure to the interior of the can and then connect the pocket space with said instrument, and means for increasing the pressure in the pocket space when connected with said instrument independently of any increase resulting from can leakage.

9. In a can testing machine, the combination of a rotatable carrier, a plurality of closable can testing pockets carried thereby, means for establishing an atmospheric pressure in the space surrounding a can in a pocket, means for establishing a super-atmospheric pressure in such can, a pressure sensitive instrument including a diaphragm having one face exposed to atmospheric pressure, means for increasing the pressure in said space by a predetermined amount, and means for subjecting the other face of said diaphragm to said increased pressure of said space.

10. In a can testing machine, the combination of a chambered pocket adapted to be sealed about the can to be tested, means for imposing a super-atmospheric pressure within the can, a pressure sensitive instrument arranged to be connected with said pocket, and means for imposing a super-atmospheric pressure within said pocket just short of sufficient to cause actuation of said instrument in the absence of a leaky can in said pocket.

11. In a can testing machine, the combination of a chambered pocket adapted to be sealed about the can to be tested, means for creating a predetermined superatmospheric pressure in said pocket around the can, means for creating a pressure in said can greater than the surrounding pressure in the pocket, a pressure sensitive instrument operable by a pressure slightly in excess of said created pocket pressure, and means for subjecting said instrument to the pressure existing in said pocket after the creation of said respective pressures in said can and surrounding pocket.

ALLAN M. CAMERON.
VALENTINE LELINSKI.